United States Patent
Zhang

(10) Patent No.: US 8,132,299 B2
(45) Date of Patent: Mar. 13, 2012

(54) CORD SAFETY DEVICE FOR A WINDOW COVERING

(75) Inventor: De-Jun Zhang, Dongguan (CN)

(73) Assignee: Nien Made Enterprise Co., Ltd., Taichung (TW)

( * ) Notice: Subject to any disclaimer, the term of this patent is extended or adjusted under 35 U.S.C. 154(b) by 1021 days.

(21) Appl. No.: 12/056,523

(22) Filed: Mar. 27, 2008

(65) Prior Publication Data
US 2009/0241295 A1    Oct. 1, 2009

(51) Int. Cl.
*F16G 11/10* (2006.01)
*E06B 9/30* (2006.01)
(52) U.S. Cl. .................. 24/115 F; 160/178.1 R
(58) Field of Classification Search ........... 160/178.1 R; 24/128, 115 F
See application file for complete search history.

(56) References Cited

U.S. PATENT DOCUMENTS

| 5,473,797 | A | 12/1995 | Wu |
| 5,504,977 | A | 4/1996 | Weppner et al. |
| 5,560,414 | A | 10/1996 | Judkins et al. |
| 5,562,140 | A | 10/1996 | Biba |
| 5,592,983 | A | 1/1997 | Sartini et al. |
| 5,906,233 | A | 5/1999 | May |
| 6,910,517 | B1 | 6/2005 | Randall |

*Primary Examiner* — Jack W. Lavinder
(74) *Attorney, Agent, or Firm* — WPAT, PC; Justin King

(57) ABSTRACT

A cord safety device for a window covering includes a first and a second body. The first body includes: a first pivot portion, disposed on a periphery; a first fixing portion, disposed on a periphery at a predetermined angle with respect to the first pivot portion; a first stop portion, disposed on an inner side of the first body and protruded towards the second body; a first recess, disposed on an upper periphery; and a guiding block, disposed on one end of the first stop portion adjacent to the first fixing portion, in which the guiding block has a guiding surface for guiding the cords. The second body includes: a second pivot portion, disposed corresponding to the first pivot portion; and a second fixing portion, disposed corresponding to the first fixing portion, thereby being separably fixed with the first fixing portion.

23 Claims, 9 Drawing Sheets

CORD SAFETY DEVICE FOR A WINDOW COVERING

BACKGROUND OF THE INVENTION

1. Field of the Invention

The present invention relates to a cord safety device for a window covering, and more particularly to a cord safety device, in which once one of the pull cords is moved to a predetermined position of the cord safety device, an angled opening of the cord safety device is opened sidewardly and the cord safety device is further divided into two bodies completely, such that the cords and the bodies are quickly released, thereby preventing the cords from forming a closed loop and a child from strangling when the child's neck caught in the loop.

2. Related Art

Currently, common cord lock structures for window coverings are mostly hollow-shaped and have a through hole in the center of an end surface thereof. Meanwhile, (a plurality of) cords of the window coverings pass through the said through hole. Then, the tail end of each cord is respectively knotted, or the tail ends of all the cords are tied into one big knot, so as to limit the tail ends of the cords by the through hole, wherein the cords and the cord lock are combined. However, the knots at the tail ends of the cords or the combination of the cords and the cord lock are easily formed into a closed cord loop. Once a child plays under the cords or uses the cords inappropriately, he/she may be caught by the closed cord loop and may not get rid of the cord loop independently, and as a result, an accidental strangling may occur. In order to solve the above problem, relevant patents have been disclosed, which are described as follows.

The U.S. Pat. No. 5,473,797 (Prior Art 1) discloses a safety device for fixing cords of Venetian blind. When placing the cords in the safety device, it does not need to knot at the tail ends of the cords, but directly puts the cords into a space between an inner surface of a fending edge and an elastic stop blade, thereby clipping the cords. In case of operating the blinds in an inappropriate way, since an external force is larger than the clipping force, the cords are forced to be opened and separated from each other. In this manner, the assembled upper and lower covers are apart from each other, and the cords are quickly separated and released accordingly. However, if the external force is not larger than the clipping force of the cord buckle, the assembly may possibly not release the cords as designed.

The U.S. Pat. No. 5,504,977 (Prior Art 2) discloses a device for releasably holding cords, in which one of the bodies includes an inclined guiding surface and a slot located on the bottom part. One of the cords is fastened on one side of the body, and the other cord is guided along the inclined guiding surface. When the cords are exerted with an external force, the knots of the cords slide towards the slot at the bottom part along the inclined guiding surface, such that the cords are separated from the body. However, when the cords are in the tightened state and cannot be guided downwards along the inclined guiding surface to reach the slot at the bottom part, the device may possibly not release the cords as designed.

The U.S. Pat. No. 5,560,414 (Prior Art 3) discloses a releasable operating cord connector for a window covering, in which the cord connector has at least two bodies, and the knots of the cords are stopped by the cord stops of the two said bodies that are moved relative to each other. Furthermore, the relative edges of the two bodies have a combining portion respectively to combine each other and form the cord connector. When the neck of the child or the user is caught by accident while he/she is playing with the cords, the tensioned operating cords apply forces against the combining portions to urge the bodies into an open condition, such that the cords are quickly loosened and released from the bodies completely, so as to avoid an accidental strangling. However, when the applied external force is not sufficient for urging the combining portions into an open condition, it may possibly fail the function of separating the cords from the bodies.

The U.S. Pat. No. 5,562,140 (Prior Art 4) discloses a releasable operating cord connector for window covering, which has a fixed side member and a movable side member pivoted on the fixed side member. The two side members respectively have a cord abutment means and a cord retaining means. When the cord abutment means are combined, an opening for the cords to pass is formed on the upper part thereof, and each cord retaining means limits the knots of the cords. In case of an abnormal usage, the cords are urged into an open condition due to the external force, so as to open the combined cord abutment means and the cord retaining means, and thus, the cords are quickly separated from the side members. However, when the external force is not sufficient for opening the cord abutment means, it may possibly lose the function of separating the cords from the side members.

The U.S. Pat. No. 5,592,983 (Prior Art 5) discloses a pull cord safety device, which is similar to the structure of the Prior Art 4, except that in the Prior Art 4, the knots of the cords are stopped by the cord retaining means, whereas in this patent (Prior Art 5), the knots of the cords are stopped by an opening of the members, and the functions thereof are the same as that in the Prior Art 4, which thus will not be described repeatedly. However, when the external force is not large enough to open the opening, it may possibly lose the function of separating the cords from the members.

The U.S. Pat. No. 5,906,233 (Prior Art 6) discloses a safety device and system for window covering pull cords, in which two cords are respectively disposed on left and right members, and each member has a relatively inclining surface engaged with a snapping portion as a whole. Once an external force is applied to the two cords, if the distance of the two pull cords is larger than a parallel engaging distance between the inclined surface structures for the members, the snapping portions in the members are separated from each other, so as to separate the two members and to release the cords accordingly. However, if it intends to dispose a plurality of cords, a plurality of devices is required to combine the cords into different layers, which results in the complicity and inconvenience for assembling and disassembling the cords.

The U.S. Pat. No. 6,910,517 (Prior Art 7) discloses an equalizing connector for multi-cord architectural covering, in which the connector structure includes two releasable outer shells and a compressible inner assembly. Due to an upward spring force generated by the inner assembly, the upper end position of the outer shell is snapped, and the two cords are respectively fixed in recesses on two sides of each outer shell. When the cords are forced to open due to the external force, the combined outer shells are pulled and separated from each other, such that the outer shells are inversely separated towards two opposite sides to form two separate components. However, if the elastic force generated by the inner assembly is weakened, it will not catch the two sides of the outer shell. Furthermore, if it intends to dispose a plurality of cords, a plurality of buckles is required for combining those cords, which results in the complexity and inconvenience for assembling and disassembling the cords.

However, in the above cord safety devices, the open end is located on the upper part, such that it needs to apply forces to separate the cords from the side members. If the force applied to the cords is not sufficient for opening the cord safety device, or the included angle or distance between the cords is not large enough for opening the cord safety device, it cannot separate the cords from the side members to release the cords easily, which may result in accidents. If more than two cords are mounted, a plurality of buckles is required for combining those cords, which results in the assembling and disassembling difficulties. Therefore, such devices still have defects in usage, and it is necessary to make improvements on such cord safety device, so as to offer safety and convenience to the user.

SUMMARY OF THE INVENTION

In accordance with the teachings of the present invention, the cord safety device for a window blind provided the internal cords be moved to a predetermined position on a side edge of the cord safety device, the cords are immediately separated from the bodies by means of the structural design of the bodies.

The present invention provides a cord safety device for a window covering, such as a window blind or shade. The window blind includes a head rail, a bottom rail, a covering material located between the head rail and the bottom rail, and several pull cords passing through the head rail and the covering material to reach the bottom rail. The cord safety device is used to limit or release at least two pull cords exposed at an outer side of the window blind. The cord safety device includes a first body and a second body corresponding to the first body. The first body has a first outer side and a first inner side, and further includes: a first pivot portion, disposed at the rim of the first body and related to the side position of the cord; a first fixing portion, disposed at the rim of the first body and the opposite side of the first pivot portion along an extending direction of the cord, and forming a predetermined angle with respect to the first pivot portion; a first stop portion, disposed at a predetermined position of the first inner side and protruded towards the second body; and a first recess, disposed at a predetermined position of an upper rim of the first body, such that provides at least two pull cords to slide therein.

The second body has a second outer side and a second inner side, and further includes: a second pivot portion, disposed corresponding to the first pivot portion, so as to be pivoted to the first pivot portion, and a second fixing portion, disposed corresponding to the first fixing portion, so as to be separably fixed with the first fixing portion.

The first body further has a guiding block located on one end of the first stop portion adjacent to the first fixing portion. The guiding block has a curved surface for guiding the cords to move towards the setting position between the first fixing portion and the second fixing portion. At least one cord may sequentially slide to the first fixing portion along a path formed by the first stop portion, the guiding block, and the curved surface, such that the first fixing portion is inversely separated from the second fixing portion with the first pivot portion as the axis center, and then the first pivot portion and the second pivot portion are completely separated.

The second body further includes a second stop portion disposed on the second inner side corresponding to the first stop portion, and a predetermined distance exists between the first stop portion and the second stop portion.

Furthermore, the second body further includes a second recess disposed corresponding to the first recess. One end of the first recess or/and the second recess has an arc surface along the edge of each recess and adjacent to relative fixing portions.

Preferably, the cord safety device of the present invention further includes a first scarf portion and a second scarf portion. The first scarf portion is disposed on the first body and protruded towards the second body, and the second scarf portion is disposed on the second body corresponding to the first scarf portion, thereby conform to the first scarf portion. The first scarf portion further includes a through hole for another cord to pass through.

In addition, the cord safety device of the present invention includes a first scarf portion protruded towards the second body, and the second body further includes a second scarf portion disposed corresponding to the first scarf portion and protruded towards the first body, thereby making it embedded with the first scarf portion. A through hole is formed on the first scarf portion, or on the embedded position for the first scarf portion and the second scarf portion to provide another cord to pass through.

Therefore, with the above structure, when the cord is applied with an external force and moved towards the first fixing portion along the first recess, the cord is moved towards the first recess close to the end of the first fixing portion and continuously moving. A distance between the first recess and the second body or between the first recess and the second recess is much shorter than a diameter of the cord, so as to successively open the two combined fixing portions. Furthermore, the cord may easily open the two fixing portions along the guiding block. The two fixing portions and the two pivot portions are respectively disposed on two side periphery positions of the two bodies corresponding to each other along the extending direction of the cord. Therefore, when the two bodies are opened, the bodies are separated from each other in opposite direction with the first pivot portion and the second pivot portion as the axis center respectively. When the included angle between the first inner side and the second inner side reaches a predetermined angle, the first body and the second body are completely separated from each other and the cords are released accordingly, so as to achieve the purpose of the present invention, thereby avoiding the accidental strangling.

BRIEF DESCRIPTION OF THE DRAWINGS

The present invention will become more fully understood from the detailed description given herein below for illustration only, which thus is not limitative of the present invention, and wherein.

DETAILED DESCRIPTION OF THE INVENTION

In order to make the technical means for achieving the purposes of the present invention be more comprehensible, a detailed description is given below with reference to the embodiments and accompanying drawings hereinafter.

Figure 1:
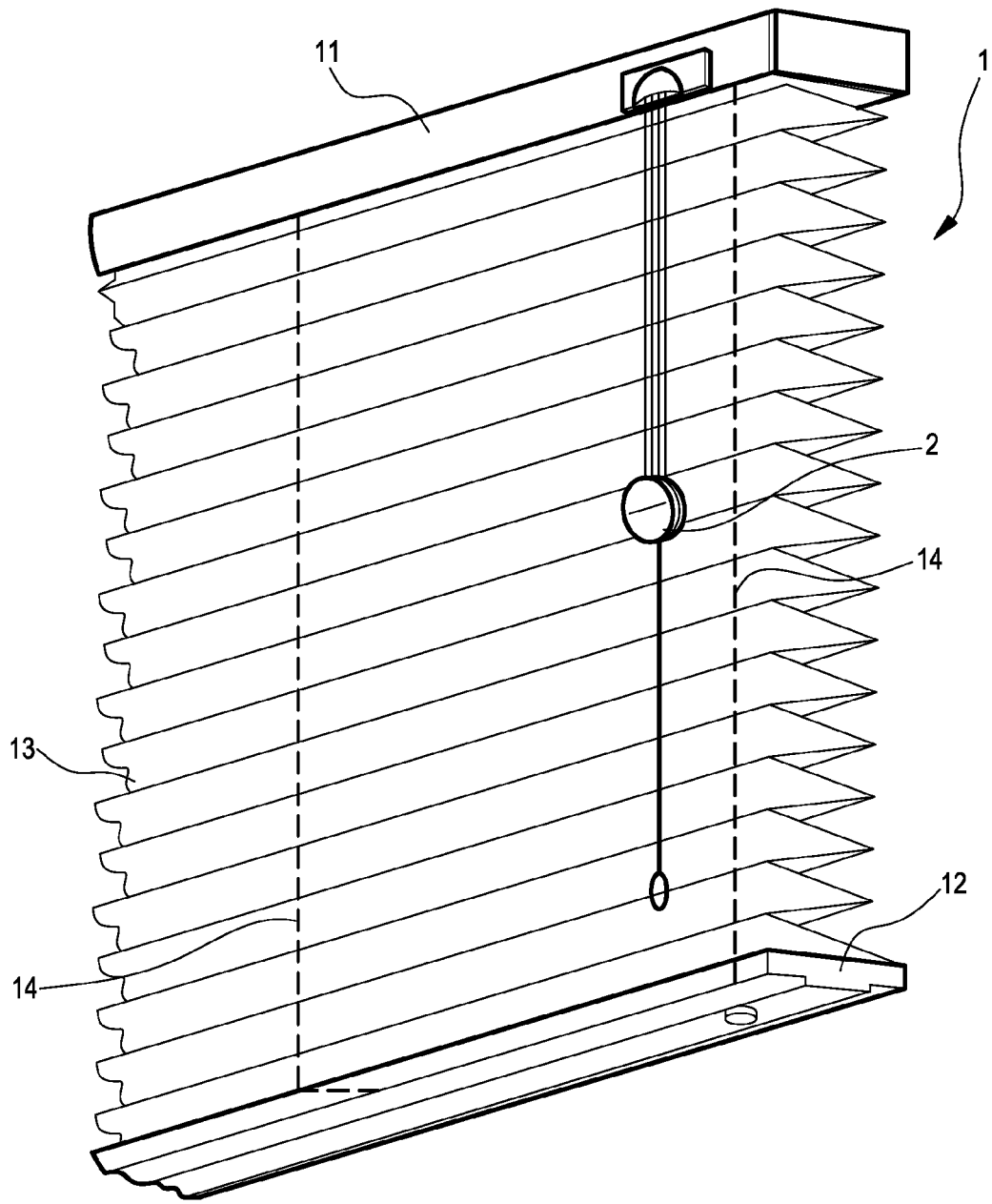
FIG. 1 is a schematic drawing of the present invention combined with a common window blind.

Referring to FIG. 1, it is a schematic drawing of the present invention combined with a common window blind. The window blind 1 includes a head rail 11, a bottom rail 12, a covering material 13 located between the head rail 11 and the bottom rail 12, and pull cords 14 passing through the head rail 11 and the covering material 13 to reach the bottom rail 12.

Figure 2:
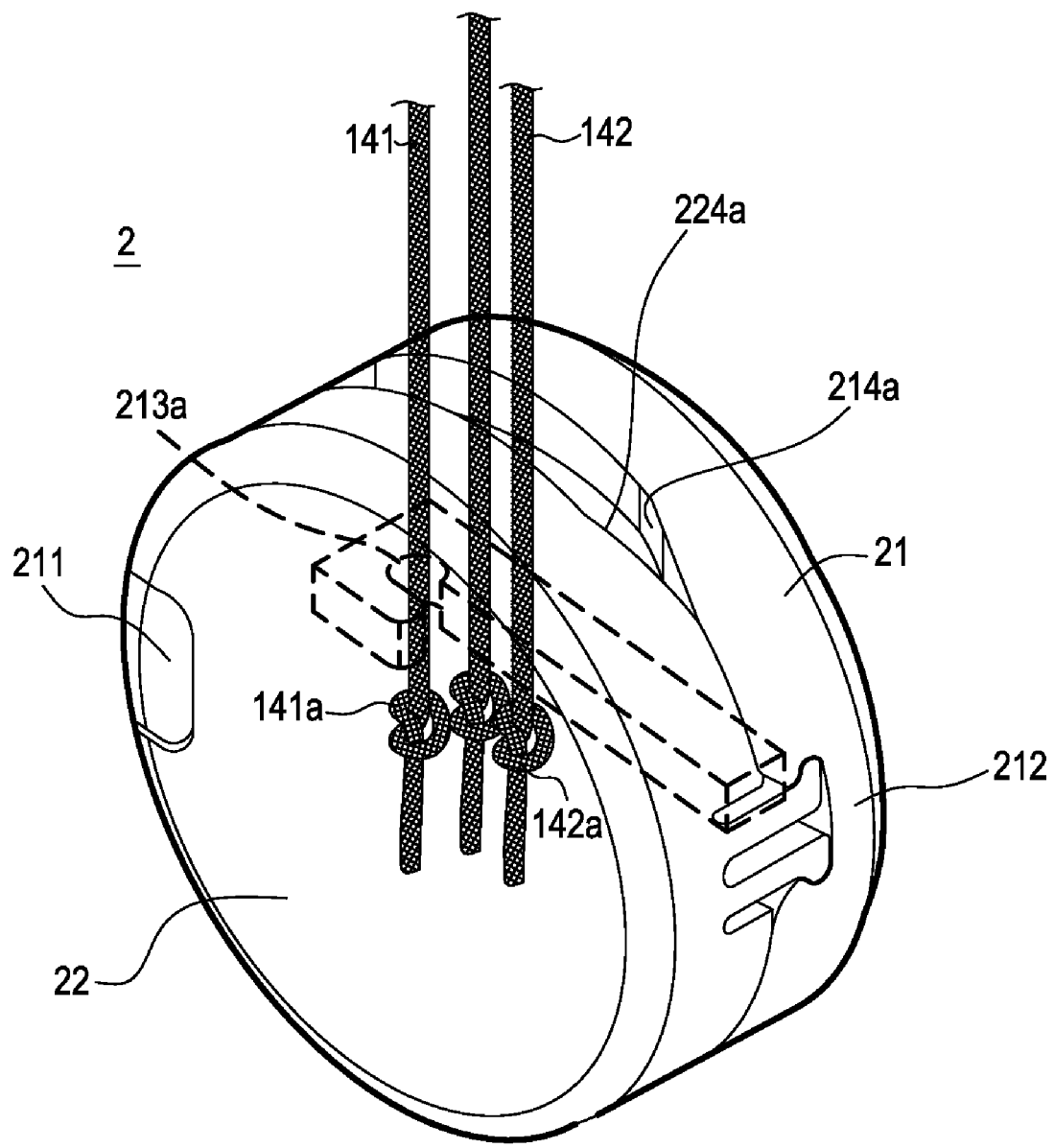
FIG. 2 is an assembly drawing of a first preferred embodiment of the present invention.
Figure 3:
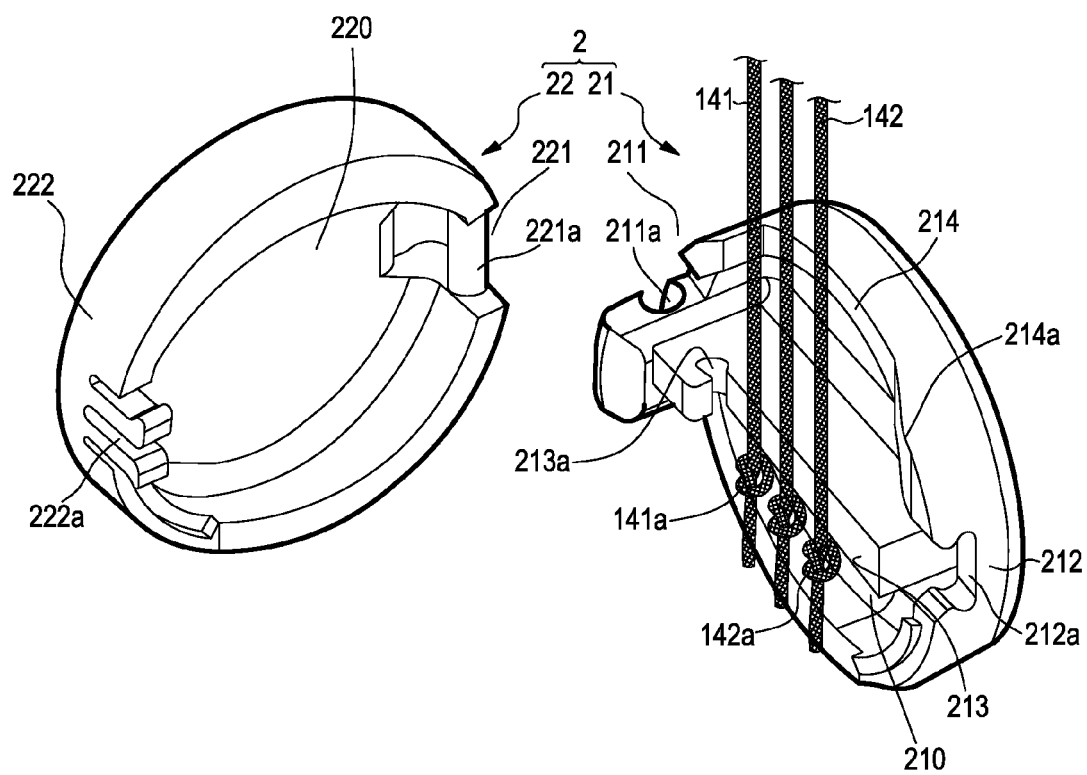
FIG. 3 is an exploded drawing of the first preferred embodiment of the present invention.

Referring to FIGS. 2 and 3, they are respectively an assembly drawing and an exploded drawing of a first preferred embodiment of the present invention. A cord safety device 2 in this embodiment includes a first body 21 and a second body 22. The first body 21 has a first inner side 210, a first pivot portion 211, a first fixing portion 212, a first stop portion 213, and a first recess 214. The second body 22 has a second inner side 220, a second pivot portion 221, and a second fixing portion 222. When the first body 21 and the second body 22 are combined into a hollow open-close structure, the cord safety device 2 of the present invention is used to limit or release at least two cords 141 and 142 that are exposed at the outer side of the window blind 1.

The first pivot portion 211 is disposed at a rim of the first body related to the cord 141, and preferably, the first pivot portion 211 has an arc-shaped recess 211a. The second pivot portion 221 is disposed corresponding to the first pivot portion 211, wherein pivoted to the first pivot portion 211, and preferably, the second pivot portion 221 has a pivot 221a. Alternatively, the pivot may also be disposed on the first body, the arc-shaped recess may be disposed on the second body (not shown), and the combining manner is not limited here.

The first fixing portion 212 is set at the rim of the first body 21 with respect to the first pivot portion 211 along the extending direction of the cord 142, and it forms a predetermined angle with respect to the first pivot portion 211. The second fixing portion 222 is disposed corresponding to the first fixing portion 212, thereby being separably fixed with the first fixing portion 212. For example, the elastically toothlike element 222a is engaged with the corresponding clipping slot 212a, and the arc-shaped recess 211a is pivoted to the corresponding pivot 221a, such that the first body 21 and the second body 22 are combined and fixed together. Alternatively, the elastically toothlike element 222a may also be disposed on the first body, the clipping slot 212a may also be disposed on the second body (not shown), and the combining manner is not limited here.

The first stop portion 213 is disposed at the predetermined position of the first inner side 210 and protruded towards the second inner side 220, and a predetermined distance between the first stop portion 213 and the second inner side 220 is not larger than the minimum width of a clipping element (e.g., knots 141a and 142a) at the end of the cord. The first stop portion 213 further has a stop recess 213a for clipping one cord 141, so as to prevent the cord 141 from being separated from the first body 21. The width of the stop recess 213a is slightly smaller than the size of the cord knots 141a and 142a, such that the cord safety device 2 in this embodiment is fastened on the cords 141 and 142. When the first body 21 and the second body 22 are separated from each other, the first stop portion 213 may limit the knot 141a or 142a of at least one cord. The first recess 214 is disposed at the predetermined position of the upper rim of the first body 21. When the first body 21 and the second body 22 are combined together, at least two cords 141 and 142 are made to slide in the first recess 214.

Figure 4:
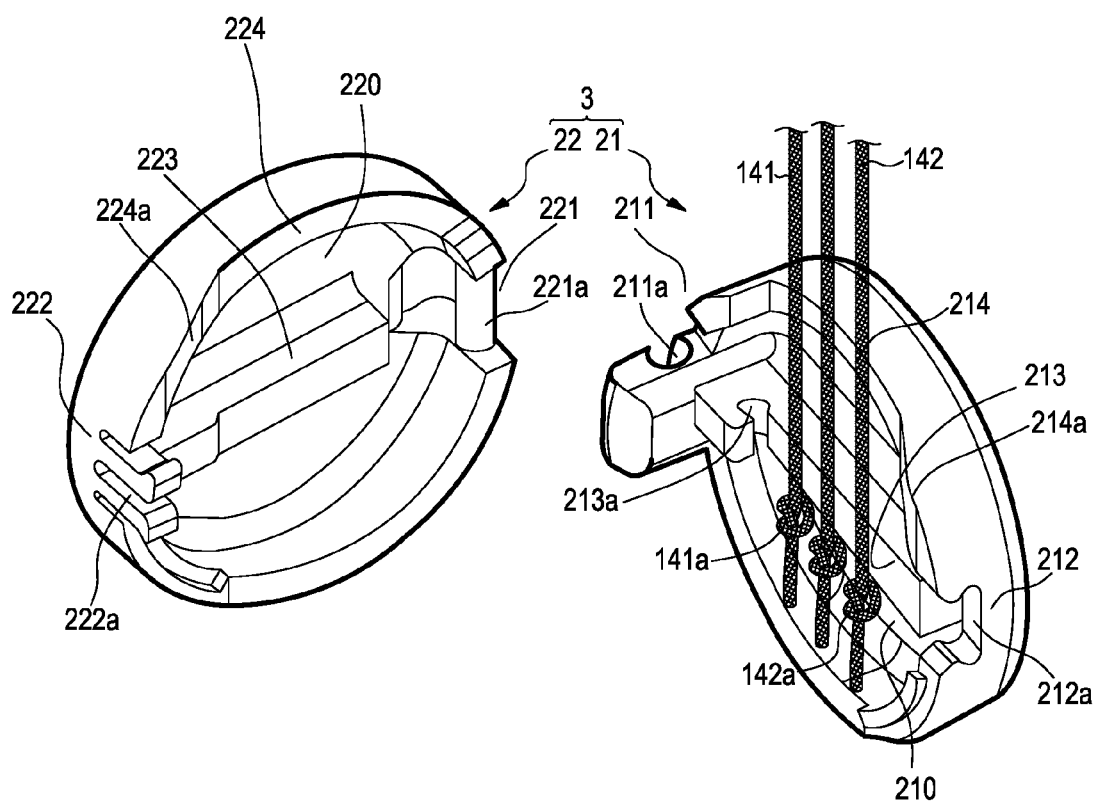
FIG. 4 is a schematic drawing of a second preferred embodiment of the present invention.
Figure 5:
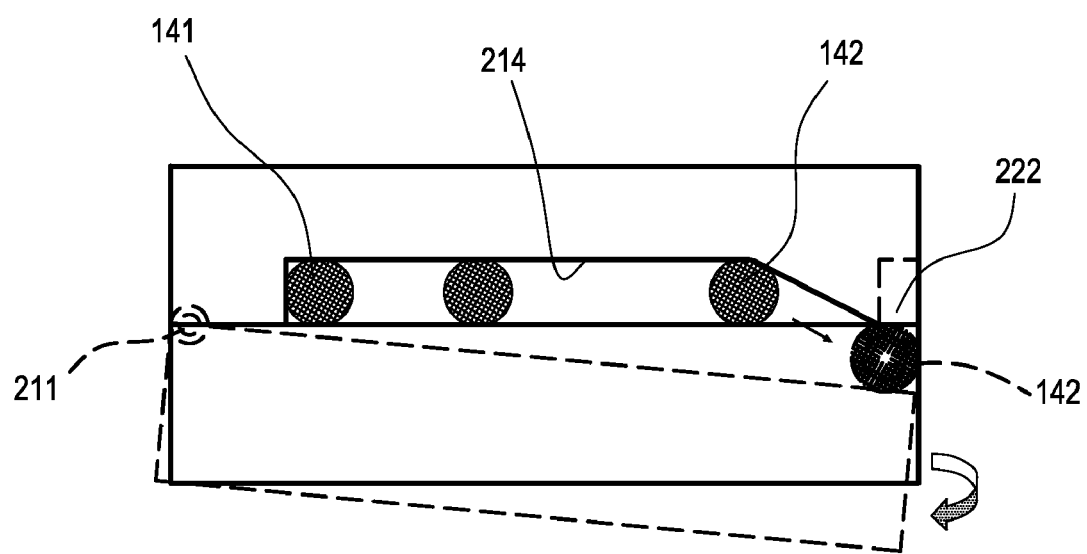
FIG. 5 is a top view of a moving path of cords according to the present invention.

Furthermore, referring to FIG. 4, it is a schematic drawing of a second preferred embodiment of the present invention. Those elements in this embodiment the same as that in the first preferred embodiment are marked with the same reference numerals. The cord safety device 3 in this embodiment is similar to the cord safety device 2 and the difference is that the second body 22 is disposed with a second recess 224 corresponding to the first recess 214. The first recess 214 forms with an arc surface 214a along the edge thereof and adjacent to one end side of the first fixing portion 212. Definitely, the second recess 224 may also form with an arc surface 224a along the edge thereof and adjacent to one end side of the second fixing portion 222. Referring to FIG. 5, it is top view of a moving path of cords according to the present invention. When the first body 21 and the second body 22 are combined, an included angle is formed between the arc surface 214a of the first recess 214 and the arc surface 224a of the second recess 224. Once the cord 142 is moved by an external force to a position where the diameter of the cord is slightly larger than the distance in the included angle formed by the arc surface 214a and 224a, the first fixing portion 212 is just separated from the second fixing portion 222 in opposite direction with the first pivot portion 211 as the axis center. When the included angle of the first inner side 210 and the second inner side 220 becomes a predetermined angle, the first pivot portion 211 and the second pivot portion 221 are completely separated, that is, the first body 21 and the second body 22 are completely separated and the cords are released accordingly.

Furthermore, the second body 22 in this embodiment further includes a second stop portion 223 disposed on the second inner side 220 corresponding to the first stop portion 213. A predetermined distance between the first stop portion 213 and the second stop portion 223 is not larger than the minimum width of the clipping element (e.g., knots 141a and 142a) at the end of the cord. By means of the engagement of the first stop portion 213 and the second stop portion 223, the cord safety device 3 is clipped on the cords 141 and 142.

Figure 6:
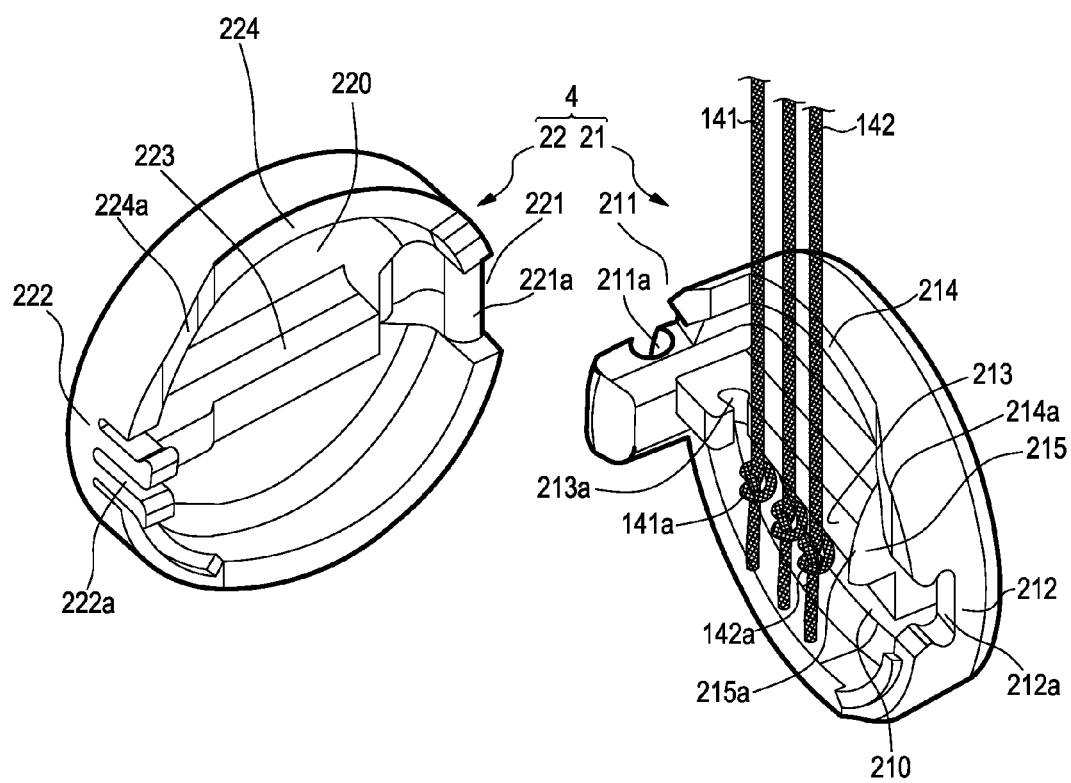
FIG. 6 is a schematic drawing of a third preferred embodiment of the present invention.

Furthermore, referring to FIG. 6, it is a schematic drawing of a third preferred embodiment of the present invention. Those elements in this embodiment the same as in the first and second preferred embodiments are marked with the same reference numerals. The cord safety device 4 in this embodiment is similar to the cord safety device 3 and the difference is the first body 21 further includes a guiding block 215 disposed on one end of the first stop portion 213 adjacent to the first fixing portion 212. The guiding block 215 has a guiding surface 215a for guiding the cord 142 to move towards the engaging position of the first fixing portion 212 and the second fixing portion 222. Therefore, with the above structure, at least one cord 142 sequentially slides to the first fixing portion 212 along a path formed by the first stop portion 213, the guiding block 215, and the guiding surface 215a, such that the first fixing portion 212 is just separated from the second fixing portion 222 in opposite direction with the first pivot portion 211 as the axis center. When the included angle of the first inner side 210 and the second inner side 220 becomes a predetermined angle, the first pivot portion 211 is just completely separated from the second pivot portion 221, that is, the first body 21 and the second body 22 are completely separated from each other and the cord is released accordingly.

With the above structure, when the first body 21 and the second body 22 are combined together, the cords 141 and 142 pass through the first recess 214 (or the second recess 224) and the first stop portion 213 (or the predetermined distance between the first stop portion 213 and the second stop portion 223), and then, they are limited by the first stop portion 213 (or the first stop portion 213 and the second stop portion 223) with the cord knots 141a and 142a. By means of the engagement between the two fixing portions 212 and 222 and the two pivot portions 211 and 221, the first body 21 and the second body 22 are combined together.

Figure 7:
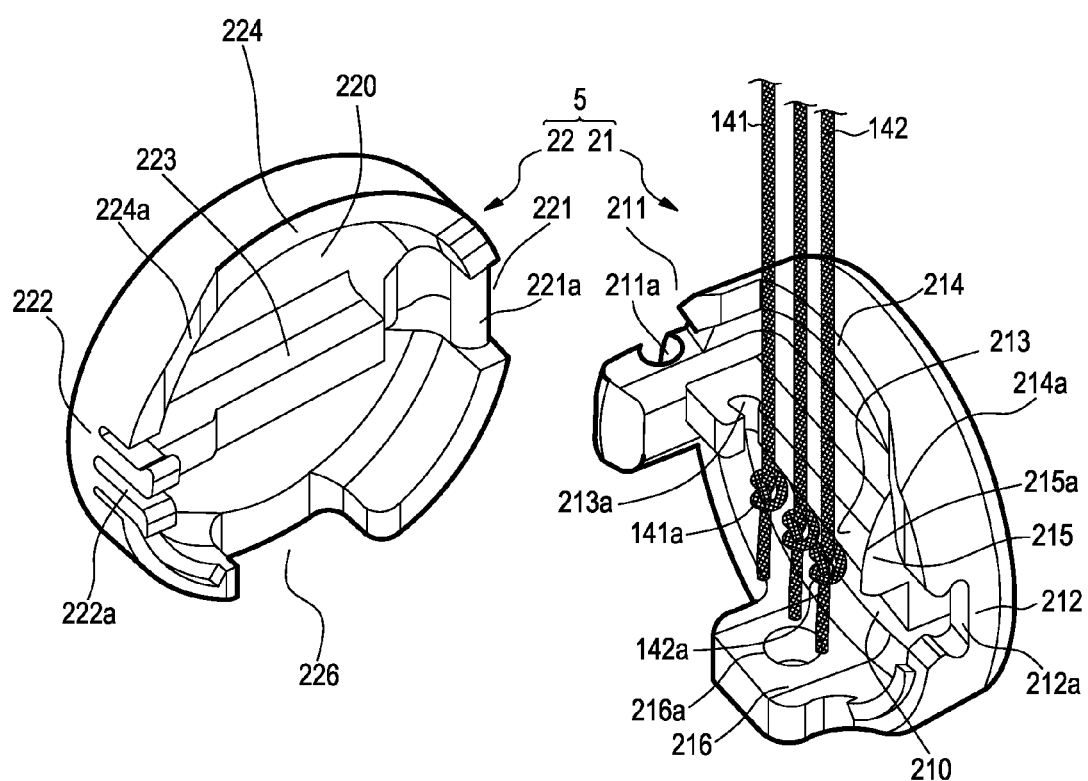
FIG. 7 is a schematic drawing of a fourth preferred embodiment of the present invention.

Furthermore, referring to FIG. 7, it is a schematic drawing of a fourth preferred embodiment of the present invention. Those elements in this embodiment the same as n the above preferred embodiments are marked with the same reference numerals. The cord safety device 5 in this embodiment is similar to the cord safety device 4 and the difference is the cord safety device 5 further includes a first scarf portion 216 and a second scarf portion 226. The first scarf portion 216 is disposed on the first body 21 and is protruded towards the second body 22. The second scarf portion 226 is disposed on the second body 22 corresponding to the position of the first scarf portion 216, thereby accommodating the first scarf portion 216. For example, the first scarf portion 216 may be a protruding plate, the second scarf portion 226 may be a notch, wherein the first scarf portion further has a through hole 216a for another cord (not shown) to be fastened, thereby controlling the rising and lowering of the cord safety device or providing multiple cords to assemble in different layers.

Figure 8:
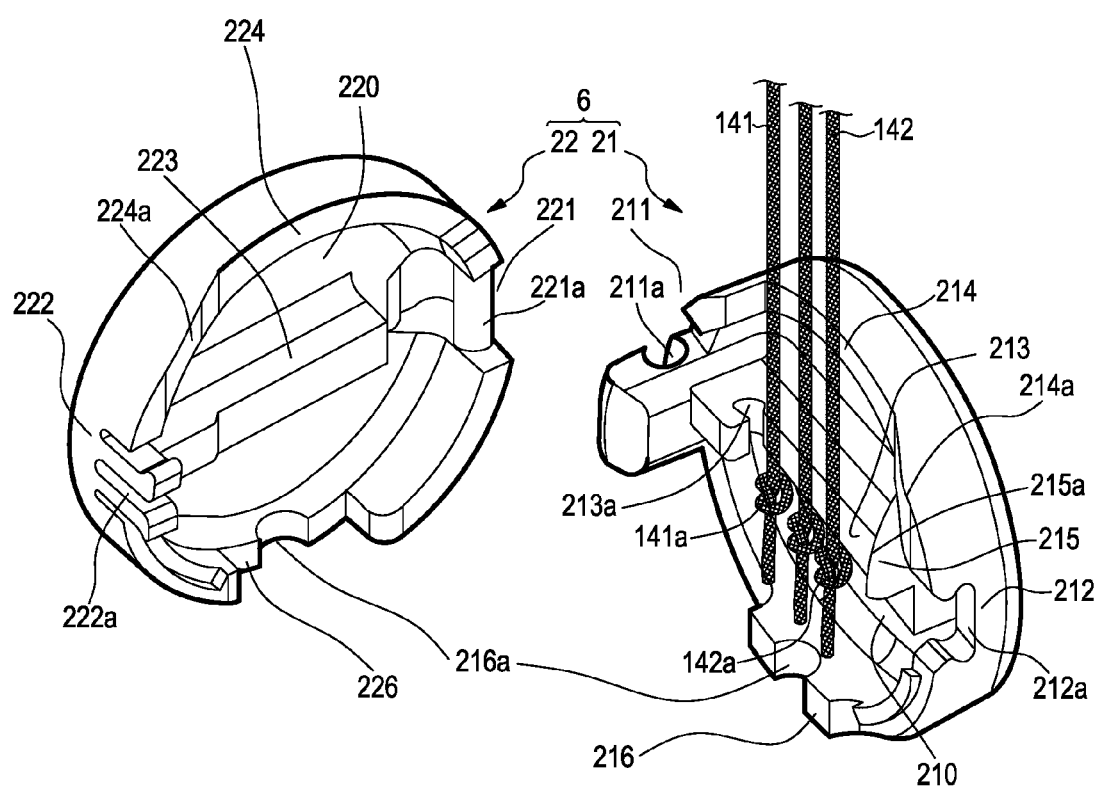
FIG. 8 is a schematic drawing of a fifth preferred embodiment of the present invention.

Referring to FIG. 8, it is a schematic drawing of a fifth embodiment of the present invention. The cord safety device 6 in this embodiment is similar to the cord safety device 5 in the fourth preferred embodiment and the difference is the second scarf portion 226 protrudes towards the first scarf portion 216, and the hole 216a for another cord to pass through is formed at the embedded position of the first scarf portion 216 and the second scarf portion 226. In addition, the first scarf portion may be a notch, and the second scarf portion may be a protruding plate, which will not be limited here. The hole 216a may be disposed close to the position of the first fixing portion 212, and accordingly the cords 141 and 142 are extended toward the first pivot portion 211, so as to avoid the situation that the first body 21 and the second body 22 are separated from each other when the cords 141 and 142 are moved to the side end position of the safety cord device under the normal usage.

Figure 9:
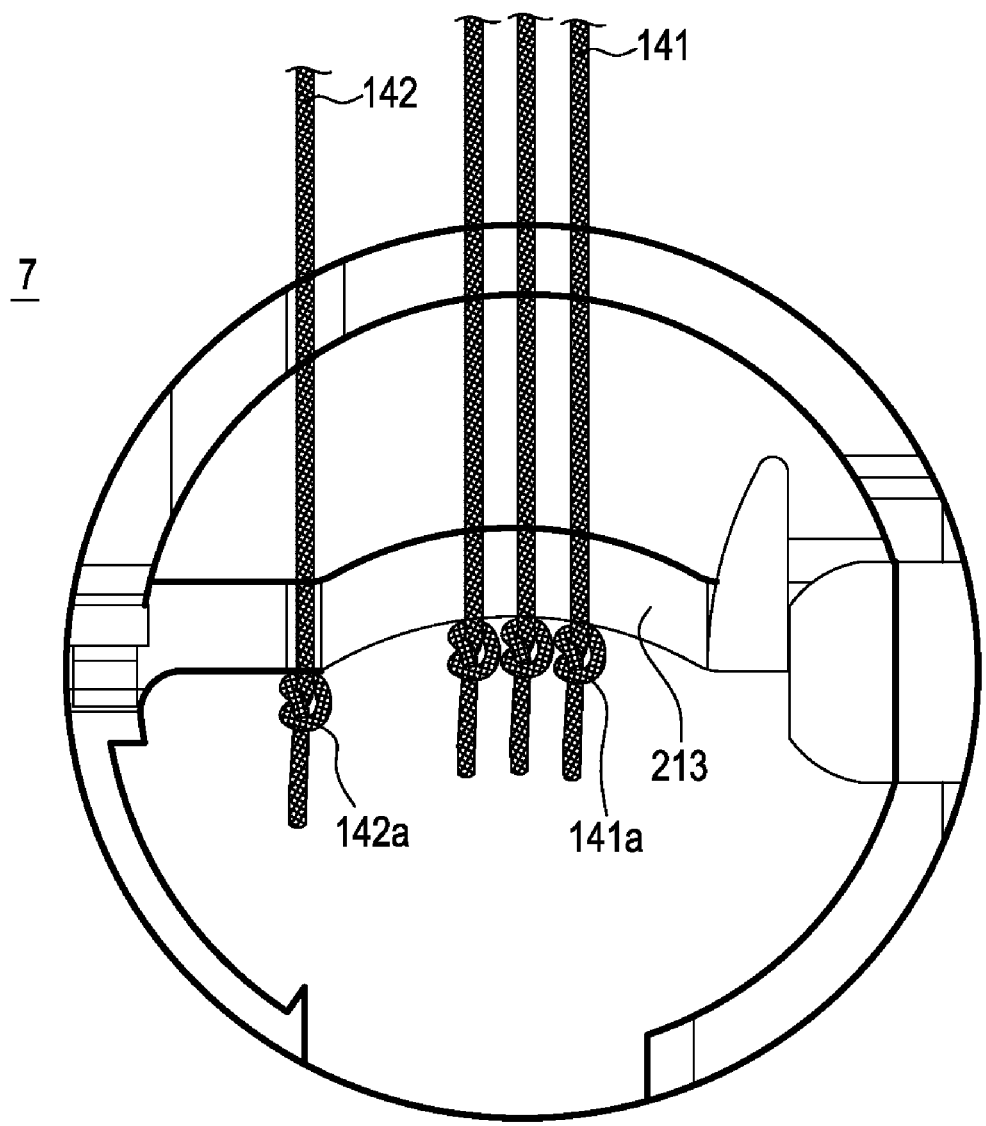
FIG. 9 is a partial schematic drawing of a sixth preferred embodiment of the present invention.

Furthermore, referring to FIG. 9, it is a partial schematic drawing of a sixth embodiment of the present invention. In the cord safety device 7 of this embodiment, the first stop portion 213 is configured into a camber structure with a downward concave. When the cord safety device 7 is in a combined state, the cord knots 141a and 142a are gathered at the highest position of the first stop portion 213 with the camber structure, thereby preventing the first body 21 and the second body 22 from being separated from each other and preventing the cords 141 and 142 free themselves when the cords 141 and 142 are moved to the side end position in the normal using status.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A cord safety device for a window covering, wherein the window covering comprises a head rail, a bottom rail, a covering material located between the head rail and the bottom rail, and several cords passing through the head rail and the covering material to reach the bottom rail; the cord safety device is used to limit or release at least two cords exposed at an outer side of the window covering, and the cord safety device comprises a first body and a second body corresponding to the first body, wherein the first body has a first inner side, and further comprises:
   a first pivot portion, disposed at a side periphery position of the cord;
   a first fixing portion, disposed at an other side periphery position with respect to the first pivot portion;
   a first stop portion, disposed at a predetermined position of the first inner side and protruded towards the second body; and
   a first recess, disposed at a predetermined position of an upper periphery of the first body to provide at least two cords to slide therein;
   wherein, the first pivot portion is located on a side of the first body and the first fixing portion is located on an opposite side of the first body along a direction perpendicular to the extending direction of the cords, such that the first pivot portion and the first fixing portion are horizontally disposed at both sides of the cords, separately;
the second body has a second inner side, and further comprises:
   a second pivot portion, disposed corresponding to the first pivot portion, so as to be pivoted to the first pivot portion; and
   a second fixing portion, disposed corresponding to the first fixing portion, so as to be separably fixed with the first fixing portion.

2. The cord safety device as claimed in claim 1, wherein the first body further comprises a guiding block located on one end of the first stop portion adjacent to the first fixing portion; and the guiding block has a guiding surface for guiding the cords to move towards an embedded position of the first fixing portion and the second fixing portion.

3. The cord safety device as claimed in claim 1, wherein the second body further comprises a second stop portion disposed on the second inner side corresponding to the first stop portion, and a predetermined distance exists between the first stop portion and the second stop portion.

4. The cord safety device as claimed in claim 3, wherein the first stop portion and the second stop portion are configured into camber structures with downward concaves.

5. The cord safety device as claimed in claim 1, wherein the second body further comprises a second recess disposed corresponding to the first recess.

6. The cord safety device as claimed in claim 5, wherein the first recess or/and the second recess forms with an arc surface along an edge of each recess and adjacent to one end side of each fixing portion.

7. The cord safety device as claimed in claim 2, wherein at least one cord sequentially slides towards the first fixing portion along a path formed by the first stop portion, the guiding block, the guiding surface, and the first fixing portion in order, such that the first fixing portion is separated from the second fixing portion in opposite direction with the first pivot portion as an axis center, and then the first pivot portion and the second pivot portion are completely separated.

8. The cord safety device as claimed in claim 1, further comprising a first scarf portion and a second scarf portion, wherein the first scarf portion is disposed on the first body and protruded towards the second body, and the second scarf portion is disposed on the second body corresponding to position of the first scarf portion, thereby accommodating the first scarf portion.

9. The cord safety device as claimed in claim 1, further comprising a first scarf portion and a second scarf portion, wherein the first scarf portion is disposed on the first body and protruded towards the second body, and the second scarf portion is disposed on the second body corresponding to position of the first scarf portion, and protruded towards the first member, thereby being mutually embedded with the first scarf portion.

10. The cord safety device as claimed in claim 1, wherein the first pivot portion has a arc-shaped recess, and the second pivot portion has a pivot pivoted to the arc-shaped recess.

11. The cord safety device as claimed in claim 1, wherein the first stop portion further has a stop recess at one end adjacent to the first pivot portion, thereby fixing one of the cords to the first member.

12. The cord safety device as claimed in claim 1, wherein the second fixing portion is an elastic zigzag element, thereby being fixed to a corresponding position of the first fixing portion.

13. A cord safety device for a window covering, wherein the window covering comprises a head rail, a bottom rail, a covering material located between the head rail and the bottom rail, and several cords passing through the head rail and the covering material to reach the bottom rail; the cord safety device is used to limit or release at least two cords exposed at an outer side of the window covering, and the cord safety device comprises a first body and a second body corresponding to the first body, wherein the first body has a first inner side, and the second body has a second inner side, wherein:
the first body comprises:
a first pivot portion, disposed at a periphery position of the first body;
a first fixing portion, disposed at a periphery position with respect to the first pivot portion;
a first stop portion, disposed at a predetermined position of the first inner side and protruded towards the second body;
a first recess, disposed at a predetermined position of an upper periphery of the first body to provide at least two cords to slide therein; and
a guiding block, disposed on one end of the first stop portion adjacent to the first fixing portion, and having a guiding surface for guiding the cords;
the second body comprises:
a second pivot portion, disposed corresponding to position of the first pivot portion, so as to be embedded with the first pivot portion; and
a second fixing portion, disposed corresponding to position of the first fixing portion, so as to be separably fixed with the first fixing portion.

14. The cord safety device as claimed in claim 13, wherein the second body further comprises a second stop portion located on the second inner side corresponding to the first stop portion.

15. The cord safety device as claimed in claim 13, wherein the first stop portion and the second stop portion are configured into camber structures with downward concaves.

16. The cord safety device as claimed in claim 13, wherein the second body further comprises a second recess disposed corresponding to the first recess.

17. The cord safety device as claimed in claim 16, wherein the first recess or/and the second recess forms with an arc surface along an edge of each recess and adjacent to one end side of each fixing portion.

18. The cord safety device as claimed in claim 13, wherein at least one cord sequentially slides to the first fixing portion along a path formed by the first stop portion, the guiding block, the guiding surface, and the first fixing portion in order, such that the first fixing portion is just separated from the second fixing portion in opposite direction with the first pivot portion as an axis center, and then the first pivot portion and the second pivot portion are completely separated.

19. The cord safety device as claimed in claim 13, wherein the first body further comprises a first scarf portion disposed on the first inner side and protruded towards the second body, and the second body further comprises a second scarf portion disposed corresponding to the first scarf portion, thereby accommodating the first scarf portion.

20. The cord safety device as claimed in claim 13, wherein the first body further comprises a first scarf portion protruded towards the second body, and the second body further comprises a second scarf portion disposed corresponding to the first scarf portion and protruded towards the first body, thereby being embedded with the first scarf portion.

21. The cord safety device as claimed in claim 13, wherein the first pivot portion has a arc-shaped recess, and the second pivot portion has a pivot pivoted to the arc-shaped recess.

22. The cord safety device as claimed in claim 13, wherein the first stop portion further has a stop recess at one end away from the guiding block, thereby preventing one of the cords from being separated from the first body.

23. The cord safety device as claimed in claim 13, wherein the second fixing portion is configured into an elastic zigzag element, for being fixed to a corresponding position of the first fixing portion.

* * * * *